April 9, 1963 O. O. HEATER 3,084,470
WEIGHTED BOBBER
Filed Aug. 8, 1961

INVENTOR.
ORVEL O. HEATER
BY
ATTORNEY

United States Patent Office 3,084,470
Patented Apr. 9, 1963

3,084,470
WEIGHTED BOBBER
Orvel O. Heater, 186 Fenton Ave., Mogadore, Ohio
Filed Aug. 8, 1961, Ser. No. 130,063
1 Claim. (Cl. 43—44.91)

This invention relates to a weighted bobber designed for use in spin or fly casting.

The device includes a light-weight bobber portion with a hole through it, and a metal plug with an eye in it to be inserted in the hole in the bobber portion. The metal plug weights the bobber portion so that it stands upright, but more importantly it provides sufficient weight to the device so that in casting it will carry a much longer distance than an unweighted bobber.

An important feature of the invention is the eye through the portion of the plug which fits in the hole in the bobber portion so that by the simple expedient of removing the plug from the hole the position of the weighted bobber on the line can readily be adjusted, and the weighted bobber is locked into position again when the plug is reinserted in the hole. The weighted bobber is not only readily attached to the line, but its position on the line is readily adjusted.

The invention is further described in connection with the accompanying drawings, in which—

Figure 1:
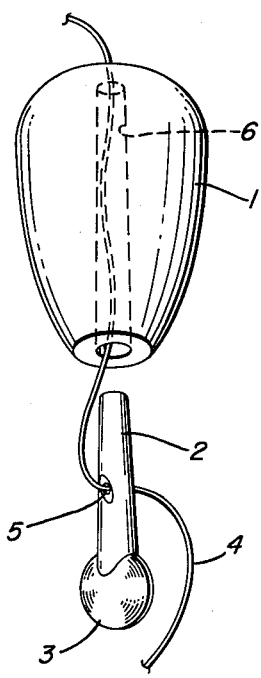
FIG. 1 is an exploded view of the weighted bobber and fishing line.
Figure 2:
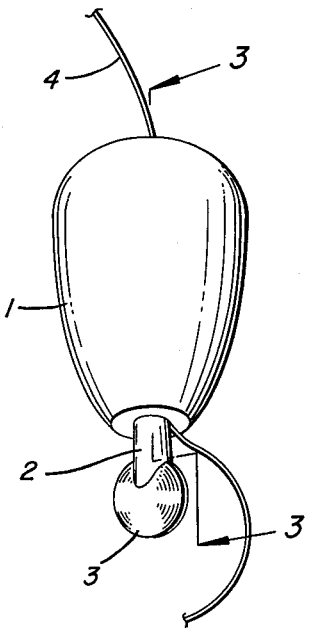
FIG. 2 shows the plug assembled in the bobber portion of the device locked into position on the line.
Figure 3:
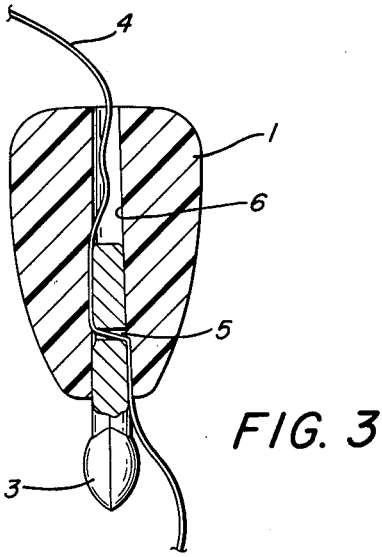
FIG. 3 is a section on the line 3—3 of FIGURE 2.

The device includes the bobber portion 1 which is of light-weight material such as wood, cork, plastic, etc. It may be a hollow plastic bobber. Its gravity is so much less than that of water that it supports the plug in the water. It is preferably a bright color so that it can easily be spotted in the water.

The plug 2 includes a tapering shank, and the particular device shown in the drawing includes a knob 3 which provides added weight. The line 4 is threaded through the eye 5 in the shank of the plug.

The line is threaded through the hole 6 through the bobber portion. It is then threaded through the eye 5 in the shank of the plug. Any amount of line is brought through the eye to bring the plug to the desired final position on the line. Then by inserting the plug in the hole, the line is squeezed between the plug and the inner surface of the hole so that the position of the weighted bobber on the line is finalized. The line serves as a cushion in producing a tight fit between the plug and the bobber portion.

If it is desired to change the position of the bobber portion on the line, the plug is removed, the position of the plug on the line is changed, and then the plug is reinserted in the bobber portion.

The line can be of any composition. The bobber and plug can be of any shape, except that the plug must contain a shank which fits in the hole through the bobber portion and there must be an eye in the portion of the shank within the bobber portion. The bobber portion may be made of any composition which is of sufficiently light weight to cause the weighted assembly to float. The plug is made of lead or babbitt or other metal that will not rust. Its size will be varied depending upon the size of the bobber portion, to produce a weight sufficient to hold the bobber portion upright and to cause the weighted assembly to carry a long distance when the line is thrown out in casting.

The invention is covered in the claim which follows.

What I claim is:

A weighted bobber to be used on a fishing line for casting, which includes a bobber portion with a hole through it, a solid plug with a tapering shank which fits freely in the hole, and an eye through a portion of the tapering shank located within the hole in the bobber portion when the plug is in the hole, the size of the hole and the largest part of the shank adapted to be located within the hole being such that the shank makes a tight fit in the hole when a line threaded through the hole and the eye is squeezed between said largest part of the shank and the inner surface of the hole, the bobber portion being of a composition which will float and carry the weight of the plug, and the plug being of a composition that is heavier than water and will weight the bobber to carry it upright and supply sufficient weight to the assembled weighted bobber to facilitate the weighted bobber carrying a long distance when used on a line in casting.

References Cited in the file of this patent
UNITED STATES PATENTS

| | | |
|---|---|---|
| 786,597 | Picken | Apr. 4, 1905 |
| 1,126,045 | Lory | Jan. 26, 1915 |
| 1,547,746 | Gore | July 28, 1925 |
| 1,850,748 | Foster | Mar. 22, 1932 |
| 2,302,549 | Hodges | Nov. 17, 1942 |
| 2,379,676 | Blackstone | July 3, 1945 |